United States Patent [19]

McGann

[11] 4,158,680
[45] Jun. 19, 1979

[54] PRODUCTION OF PURIFIED AND HUMIDIFIED FUEL GAS

[75] Inventor: Rodney McGann, Santa Cruz, Calif.

[73] Assignee: Texaco Inc., New York, N.Y.

[21] Appl. No.: 817,951

[22] Filed: Jul. 22, 1977

Related U.S. Application Data

[62] Division of Ser. No. 735,926, Oct. 27, 1976, Pat. No. 4,075,831.

[51] Int. Cl.² .............................................. B01F 3/04
[52] U.S. Cl. ..................................... 261/149; 165/60; 261/114 R; 261/151; 261/155
[58] Field of Search .............. 261/149, 148, 151, 152, 261/155-161, DIG. 77, 114 R; 165/60

[56] References Cited

U.S. PATENT DOCUMENTS

| | | | |
|---|---|---|---|
| 980,108 | 12/1910 | Lillie | 261/161 X |
| 1,010,044 | 11/1911 | Grace | 261/160 X |
| 1,140,064 | 5/1915 | Rakestraw | 261/152 |
| 1,798,065 | 3/1931 | Clark | 261/156 |
| 1,986,529 | 1/1935 | Ray | 261/161 X |
| 3,445,343 | 5/1969 | Popov | 261/148 X |
| 3,653,186 | 4/1972 | McLendon | 261/114 R X |
| 3,894,133 | 7/1975 | Coste | 261/155 X |

FOREIGN PATENT DOCUMENTS

467628  12/1951  Italy ......................................... 261/160

Primary Examiner—Richard L. Chiesa
Attorney, Agent, or Firm—Thomas H. Whaley; Carl G. Ries; Albert Brent

[57] ABSTRACT

This is a continuous process for producing a stream of purified and humidified fuel gas which may be burned in a gas turbine to produce mechanical work and electrical energy without contaminating the environment. In the process, a feed stream of raw fuel gas is preferably produced by the partial oxidation of a hydrocarbonaceous fuel with a free-oxygen containing gas, optionally in the presence of a temperature moderator. The raw fuel gas stream is then preferably saturated with water during cooling and cleaning operations. It is then passed in indirect countercurrent heat exchange with a stream of purified fuel gas containing substantially no water. The latter stream was produced by cooling and purifying said raw fuel gas stream. At least a portion of the water which is condensed out of the raw fuel gas during said cooling operation is separated and revaporized into said purified fuel gas stream. The resulting stream of purified and humidified fuel gas may be used as fuel in a gas turbine. Maximum low level heat recovery is achieved in the process along with providing the purified fuel gas stream with additional mass for expansion in the turbine.

3 Claims, 1 Drawing Figure

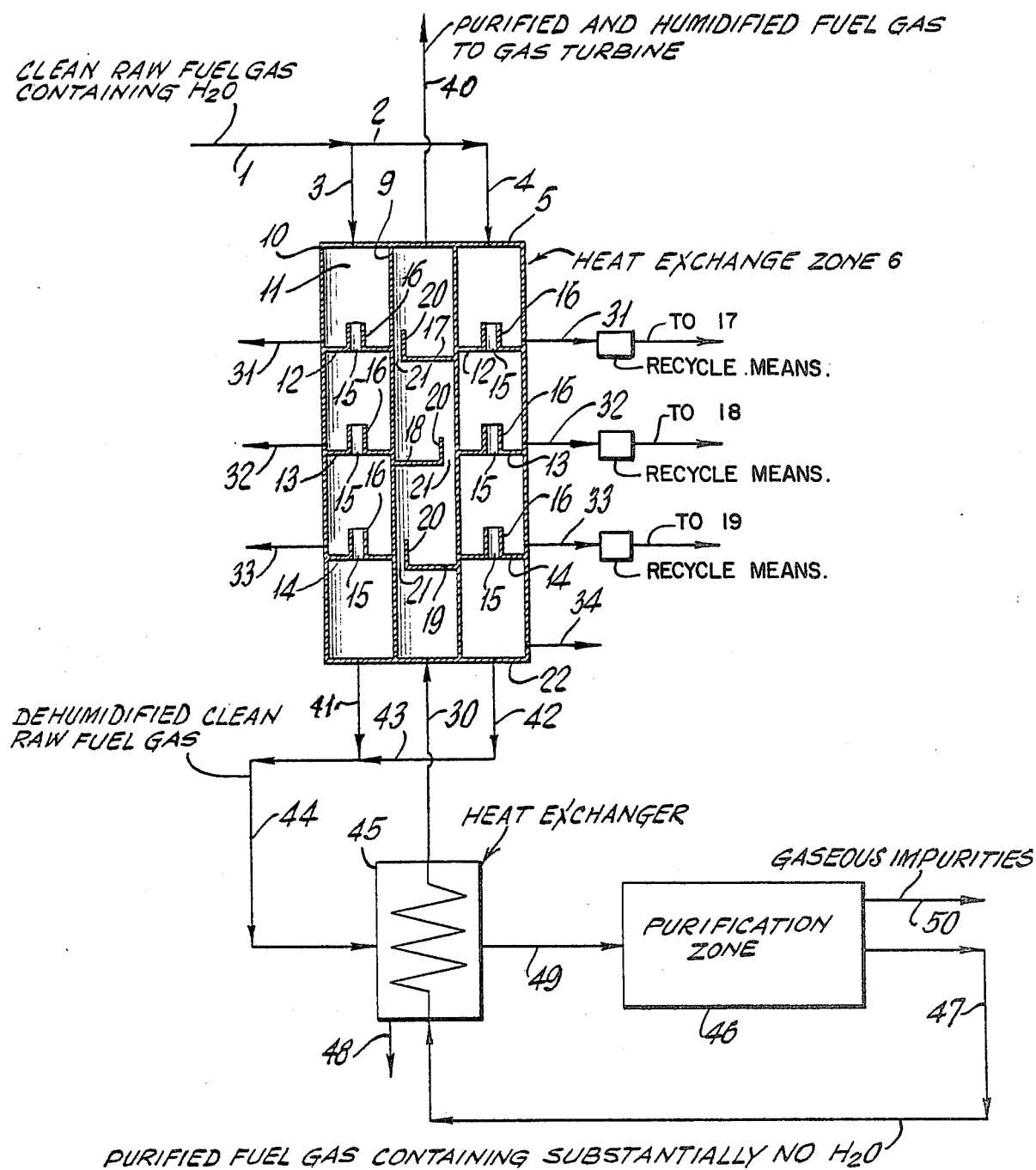

PRODUCTION OF PURIFIED AND HUMIDIFIED FUEL GAS

This is a division of application Ser. No. 735,926 filed Oct. 27, 1976 now U.S. Pat. No. 4,075,831.

BACKGROUND OF THE INVENTION

1. Field of the Invention

This invention pertains to a continuous process for making fuel gas. More specifically, the present invention relates to the production of purified and humidified fuel gas for burning in the combustor of a gas turbine to produce power. Preferably, the raw feed gas to the process is made by noncatalytic partial oxidation of a hydrocarbonaceous fuel with a free-oxygen containing gas, optionally in the presence of a temperature moderator followed by quenching and cleaning the gas stream with water.

2. Description of the Prior Art

Fuel gas produced by the partial oxidation process and then purified and burned as fuel in a gas turbine to produce mechanical power and electrical energy is described in coassigned U.S. Pat. Nos. 3,866,411 and 3,868,817—C. P. Marion et al. However, the fuel gas produced by these prior art processes is substantially dry. In contrast, the purified fuel gas produced by the subject process contains $H_2O$, and is preferably saturated with water vapor.

SUMMARY

This is a continuous process for producing purified and humidified fuel gas which may be burned in the combustor of a gas turbine to produce power. The clean raw feed gas stream to the process comprises $H_2$, CO, $H_2O$, and at least one gas from the group $CO_2$, $H_2S$, COS, $CH_4$, A and $N_2$. It may preferably be obtained by the partial oxidation of a hydrocarbonaceous fuel with a free-oxygen containing gas, optionally in the presence of a temperature moderator. The raw gas stream from the gas generator is contacted with water to cool the gas stream and to remove entrained solids. During this operation the raw gas stream attains a percentage humidity in the range of about 50–100, and is preferably saturated. The resulting clean raw feed gas stream containing $H_2O$ is at a temperature in the range of about 200° to 400° F. and a pressure in the range of about 250 to 1200, psia. It is then passed through a heat exchange zone in indirect countercurrent heat exchange with a stream of purified fuel gas containing substantially no $H_2O$, i.e. a percentage humidity in the range of about 0–15. The substantially dry purified fuel gas was produced downstream in the process by purifying the clean raw fuel gas stream after water had been removed. The temperature of the purified fuel gas is below the dewpoint of the stream of clean raw fuel gas. Consequently, during said heat exchange, substantially all of the water i.e. 90–100% of the original amount of water, in the clean raw gas feed stream is condensed out and collected. At least a portion of said condensed water is then reintroduced into said stream of purified fuel gas passing through said heat exchange zone and revaporized therein. A separate product gas stream of purified and humidified fuel gas having a percentage humidity in the range of about 90–100, and preferably saturated is thereby produced. The dehumidified clean raw gas stream leaving said heat exchange zone is introduced into said purification zone, as previously mentioned, where at least one gas from the groups $H_2O$, $CO_2$, $H_2S$, COS, $CH_4$, A and $N_2$ is removed. The resulting stream of purified fuel gas containing substantially no $H_2O$, is then passed through said heat exchange zone in heat exchange with said stream of clean raw fuel gas containing $H_2O$, as previously described.

The $H_2O$ in the purified and humidified fuel gas increases its mass flow. When used as fuel gas in a gas turbine the thermodynamic efficiency of the turbine is thereby increased, and the combustion temperature is reduced. $No_x$ gases in the turbine exhaust are thereby reduced, and environmental pollution is avoided.

DESCRIPTION OF THE INVENTION

The purified and humidified fuel gas product is made starting from a clean raw gas stream comprising $H_2$, CO, $H_2O$, and at least one gas from the groups $CO_2$, $H_2S$, COS, $CH_4$, A and $N_2$. This clean raw feed gas stream has a percentage humidity in the range of about 50–100, and is preferably saturated. The term percentage humidity is used herein in its ordinary sense which is the quotient of the number of pounds of water vapor carried by 1 lb. of dry raw gas at any temperature, divided by the number of pounds of vapor which 1 lb. dry raw gas would carry, were it completely saturated at the same temperature, times 100.

Clean raw feed gas to the process may be made by any suitable means such as by catalytic steam reformation of hydrocarbons, and preferably by the noncatalytic partial oxidation of a hydrocarbonaceous fuel with a free-oxygen containing gas, optionally in the presence of a temperature moderator in an unpacked free-flow noncatalytic partial oxidation gas generator at a temperature in the range of about 1300° to 3500° F. and a pressure in the range of about 1 to 250 atmospheres, such as 250 to 1200 psia. The gas generator is preferably a vertical steel pressure vessel, such as described in coassigned U.S. Pat. No. 2,992,906—F. E. Guptill, Jr.

Any solid particles, i.e. particulate carbon or ash entrained in the effluent gas stream from the gas generator may be removed by contacting the gas stream with water during the gas cooling and cleaning operations, for example as described in coassigned U.S. Pat. No. 2,809,104—D. M. Strasser et al. Alternately, the hot effluent gas from the gas generator may be cooled by indirect heat exchange with boiler feed water in a waste heat boiler and then scrubbed with water to remove entrained solids in a gas scrubbing zone, for example, as shown in coassigned U.S. Pat. No. 3,620,700—W. G. Schlinger et al.

A wide range of combustible carbon containing organic materials may be reacted in the gas generator with a free-oxygen containing gas optionally in the presence of a temperature moderating gas to produce the fuel gas.

The term hydrocarbonaceous as used herein to describe various suitable feedstocks is intended to include gaseous, liquid, and solid hydrocarbons, carbonaceous materials, and mixtures thereof. In fact, substantially any combustible carbon containing organic material, or slurries thereof, may be included within the definition of the term "hydrocarbonaceous." For example, there are (1) pumpable slurries of solid carbonaceous fuels, such as coal, particulate carbon, petroleum coke, concentrated sewer sludge, and mixtures thereof, in a vaporizable carrier such as water, liquid hydrocarbon fuel and mixtures thereof; (2) gas-solid suspensions; such as finely ground solid carbonaceous fuels dispersed in either a temperature-moderating gas or in a gaseous hydrocarbon; and (3) gas-liquid-solid dispersions, such as atomized liquid hydrocarbon fuel or water and particulate carbon dispersed in a temperature moderating gas. The hydrocarbonaceous fuel may have a sulfur content in the range of about 0 to 10 weight percent and an ash content in the range of about 0 to 60 weight percent.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphthenic, and aromatic compounds in any proportion.

Also included within the definition of the term hydrocarbonaceous are oxygenated hydrocarbonaceous organic material including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature, or it may be preheated to a temperature up to as high as about 600° to 1200° F., but preferably below its cracking temperature. The hydrocarbonaceous feed may be introduced into the gas generator burner in liquid phase or in a vaporized mixture with a temperature moderator. Suitable temperature moderators include $H_2O$, $CO_2$-rich gas, nitrogen and mixtures of the aforesaid temperature moderators. When liquid hydrocarbons are reacted with air, the nitrogen in the air may serve as the temperature moderator so that the addition of supplemental $H_2O$ may not be necessary. The reaction time in the fuel gas generator is about 1 to 10 seconds.

The use of a temperature moderator to moderate the temperature in the reaction zone depends in general on the carbon to hydrogen ratio of the feedstock and the oxygen content of the oxidant stream. A temperature moderator may not be required with some gaseous hydrocarbon fuels; however, generally one is used with liquid hydrocarbon fuels and with substantially pure oxygen. The temperature moderator may be introduced in admixture with either or both reactant streams. Alternatively, the temperature moderator may be introduced into the reaction zone of the gas generator by way of a separate conduit in the fuel burner.

The term free-oxygen containing gas as used herein is intended to include air, oxygen-enriched air, i.e. greater than 21 mole % oxygen and substantially pure oxygen, i.e. greater than 95 mole % oxygen (the remainder comprising $N_2$ and rare gases). Free-oxygen containing gas may be introduced by way of a conventional burner at a temperature in the range of about ambient to 1800° F. The ratio of free oxygen in the oxidant to carbon in the feedstock (O/C, atom/atom) is preferably in the range of about 0.7 to 1.5.

In a first heat exchange zone, the clean raw fuel gas containing $H_2O$ at a temperature in the range of about 200° to 400° F. and a pressure in the range of about 250 to 1200 psia, and preferably about the same pressure as that in the gas generator less ordinary pressure drop in the lines which includes the equipment i.e. about 3 to 5% pressure drop, is cooled below its dewpoint in order to condense out and separate a large part of the water contained therein. By this means about 85 to 95% of the water in the clean raw fuel gas passing through the first heat exchange zone is removed to produce a comparatively dry raw gas stream. The cooling may be effected in a conventional heat exchanger by indirect i.e. non-contact heat exchange with a counter flowing stream of the dried clean raw fuel gas after it has been cooled and purified subsequently in the process. The comparatively dry stream of clean raw fuel gas leaves the first heat exchange zone at a temperature in the range of about 80° to 200° F. and a pressure drop in the lines, which includes the equipment, of about 3 to 5%. It may be then introduced into a conventional purification zone.

Optionally, the stream of raw fuel gas entering the purification zone may be precooled in a separate conventional heat exchanger by indirect heat exchange with the stream of purified fuel gas containing substantially no $H_2O$ leaving said purification zone. Any remaining water in the stream of raw fuel gas i.e. about 0 to 5% of the moisture present in the original stream of clean raw fuel gas containing $H_2O$, may be condensed out and separated in the second heat exchanger.

Acid-gases i.e. $CO_2$, $H_2S$ and COS along with $H_2O$ and other gaseous impurities may be removed from the stream of dehumidified clean raw fuel gas in the purification zone. Suitable conventional processes may be used involving refrigeration and physical or chemical absorption with solvents, such as methanol, n-methylpyrrolidone. diethanolamine, and dimethyl ether of polyethylene glycol.

In solvent absorption processes, most of the $CO_2$ absorbed in the solvent may be released by simple flashing. The rest may be removed by stripping. This may be done economically with nitrogen. Nitrogen may be available as a low cost by-product when a conventional air separation unit is used for producing substantially pure oxygen (95 mole % $O_2$ or more) for use as the free-oxygen containing gas in the fuel gas generator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

The $H_2S$ and COS containing solvent may be regenerated by flashing and stripping with nitrogen, or alternatively by heating and refluxing at reduced pressure without using an inert gas. The $H_2S$ and COS are then converted into sulfur by a suitable process: For example, the Claus process may be used for producing elemental sulfur from $H_2S$ as described in Kirk-Othmer Encyclopedia of Chemical Technology, Second Edition Volume 19, John Wiley, 1969, Page 353. Excess $SO_2$ in the Claus plant tail gases may be removed and discarded in chemical combination with limestone, or by means of a suitable commercial extraction process. In general, the composition of the clean fuel gas in mole percent (dry basis) is about: $H_2$ 10 to 60, CO 15 to 60, $CH_4$ 0.0 to 25, $CO_2$ 0.0 to 5, $N_2$ 0.0 to 75. The Heat of Combustion in BTU/SCF is at least 70, suitably 75–350, and preferably 75 to 150, i.e. 90.

At least a portion of the condensate recovered from the first heat exchange zone is recycled and revaporated into said countercurrent flowing stream of cooled and purified fuel gas, which leaves said first heat exchanger as a stream of purified and humidified fuel gas at a temperature of about 180° to 380° F. and a percentage humidity in the range of about 30–100, and preferably 100% i.e. saturated. The pressure of this exit gas stream is preferably that in the gas generator less ordinary pressure drop in the lines (which also includes the equipment) i.e. pressure drop of about 5–10%.

When the raw fuel gas feed stream contains $H_2S$, at least a portion of the $H_2S$ may dissolve in the condensed water. In such case, it may be desirable to purify the condensed water prior to revaporating it into the stream of purified fuel gas. This may be done by any conventional means. For example in a flash chamber the pressure of the liquid condensate may be dropped thereby releasing the dissolved $H_2S$. The pressure of the condensate is then incresed before introducing it into the stream of purified fuel gas as previously described. The $H_2S$ may be introduced into a Claus process to produce by-product sulfur at an economic gain.

The product stream of purified and humidified fuel gas is then introduced into the combustion chamber of a gas turbine as fuel.

DESCRIPTION OF THE DRAWING

A more complete understanding of the invention may be had by reference to the accompanying schematic drawing partly in cross-section which shows one embodiment of the previously described process in detail. It is not intended to limit the continuous process illustrated to the particular apparatus or materials described.

With reference to the drawing, raw fuel gas from a partial oxidation gas generator (not shown) is washed with water in a gas cleaning zone (not shown) to remove any solid carbon and ash particles. The clean raw fuel gas preferably substantially saturated with water is then passed through lines 1–4 and into the upper closed end 5 of heat exchanger or heat exchange zone 6. Heat exchange zone 6 may consist of one or more heat exchangers each comprising a condensor-cooler section, an evaporator-heater section, and means (not shown) for introducing condensed water obtained in the condensor-cooler section into the evaporator-heater section. For example, it may comprise inner vertical cylinder 9 containing the evaporator-heater section, outer vertical cylindrical shaped shell 10, and annular passage 11 located therebetween and containing the condenser-cooler section. Inner and outer cylinders 9 and 10, are spaced apart by a series of vertically spaced horizontal annular shaped trays 12–14 located in annular passage 11. The trays in annular passage 11 are used for collecting water which condenses out of the gas stream passing therethrough. Each annular tray has a plurality of evenly spaced holes 15. Each hole is surrounded by and is in communication with the lower end of an open-ended vertical cylindrically shaped dam 16.

A series of horizontal segmented disc trays 17–19 are vertically spaced in inner cylinder 9. Each tray 17–19 is at about the same level as a corresponding tray 12–14. A vertical dam 20 runs along the chord at the end of each disc tray thereby providing segmented passages 21 located between the outside wall of the dam and the inside wall of inner cylinder 9. Trays 17–19 are arranged so that the stream of purified fuel gas will pass fully up through inner cylinder 9, passing through the segmented passages 21, sweeping across each tray 17–19, and revaporating the water contained therein. Indirect gas-gas heat exchanger 6 is closed at the lower end 22, except for inlet and outlet connections.

Purified fuel gas in line 30 passes through the lower end 22 of heat exchanger 6 and then up through inner cylinder 9 in indirect (noncontact) countercurrent heat exchange with the clean raw fuel gas containing $H_2O$ which is simultaneously flowing down through annular passage 11 by way of the holes 15 in plates 12–14.

The clean raw fuel gas in the condensor-cooler section of heat exchange zone 6 is thereby cooled below the dew point. Water condenses out of the raw fuel gas and collects on trays 12–14. By recycle means, not shown, i.e. pumps, valves, the condensed water may be removed from trays 12–14 by way of lines 31–33 respectively and returned to trays 17–19 in the evaporator-heater section of heat exchange zone 6.

Most of the water drops out early as the raw fuel gas stream passes down annular passage 11. The amount of water is greatest and the temperature is highest on top tray 12. The least amount of water and at the lowest temperature is collected on tray 14. Preferably, the condensate may be removed in stages and introduced into column 9 at a comparable level, as the mixed temperature will not be as effective. Thus, most of the water at the highest temperature is introduced into the purified fuel gas at a comparable level in the last stage before the purified fuel gas leaves the heat exchange zone. Any water remaining in the raw fuel gas is condensed out in a plurality of successive stages with the amounts and temperatures of the water in each successive stage being less than that in a previous stage. At least a portion of the water from each successive stage may be introduced into the purified fuel gas at a comparable level or stage. For example, the condensed water on trays 12–14 may be returned to trays 17–19 as follows: line 31 to tray 17, line 32 to tray 18, and line 33 to tray 19.

By means of another scheme, instead of trays 17–19 the condensed water may be sprayed into the stream of purified fuel gas rising in inner cylinder 9. A series of spray nozzles located at the same levels as the trays in cylinder 9 may be used. By way of line 34, excess condensed water may be returned to the quench tank or scrubber to cool, clean, and saturate the raw fuel gas stream leaving the gas generator.

As the dry purified fuel gas passes freely up inner cylinder 9, it revaporates the water in plates 17–19, and leaves as purified and humidified fuel gas from line 40 at the top of heat exchanger 5. The product gas in line 40 may be then introduced into a gas turbine as fuel.

Clean raw fuel gas containing substantially no water leaves through lines 41–43 at the bottom of annular passage 11 and is preferably introduced into a purification zone. However, in the embodiment shown in the drawing, substantially dry clean raw fuel gas may be first cooled further by being passed through line 44 into heat exchanger 45 in indirect heat exchange with the stream of purified fuel gas containing substantially no water leaving purification zone 46 by way of line 47. Any additional water that may be condensed out of the raw fuel gas stream at this time may leave heat exchanger 45 through line 48. The substantially dry raw fuel gas is passed through line 49 and into purification zone 46. In gas purification zone 46, by conventional solvent absorption techniques, or any other suitable gas purification procedure, $H_2O$ and at least one gaseous impurity from the group $H_2S$, COS and $CO_2$ may be removed from the raw fuel gas and leaves by example by way of a line 50. The substantially dry purified fuel gas in line 47 is thereby produced.

EXAMPLE

The following example illustrates an embodiment of the process of this invention pertaining to the production of an improved purified and humidified fuel gas. The example should not be construed as limiting the scope of the invention. Reference is made to the drawing and the aforesaid description of the continuous process. Flow rates are specified on an hourly basis.

The effluent gas stream from the partial oxidation of heavy petroleum resid with air in a conventional non-catalytic free-flow refractory-lined fuel gas generator (not shown in the drawing) is quenched and scrubbed with water to produce a stream of clean raw fuel gas saturated with $H_2O$ and having a temperature of 240° F., a pressure of 369 pounds per square inch absolute (psia), and the composition shown in column (2) of Table 1. 17,478 moles of the clean raw fuel gas stream are passed through lines 3 and 4, and down through annular passage 11 of heat exchange zone 5 in indirect counter flow heat exchange with 16,211 moles of a substantially dry purified fuel gas stream produced subsequently in the process and passing up through inner cylinder 9. The purified fuel gas containing substantially no $H_2O$ enters inner cylinder 9 through line 30 at a temperature of 100° F., a pressure of 348.5 psia, and with the composition shown in column (3) of Table 1.

1094 moles of $H_2O$ are condensed out of the saturated clean raw fuel gas passing down annular passage 11 and are caught by trays 12–14. 913 moles of the condensed water are pumped to trays 17–19 in inner cylinder 9 where the water revaporates into the purified fuel gas stream passing up through inner cylinder 9. 181 moles of condensed water are returned to the quenching and scrubbing zone by way of line 34. 17,124 moles of product gas at a temperature of 225° F. and a pressure of 339 psia leave heat exchange zone 6 by way of line 40. The composition of the purified and humidified fuel gas product in line 40 is shown in column (4) of Table 1. This gas stream is saturated with $H_2O$ and is then introduced into the combustor of a gas turbine (not shown in the drawing) as fuel. The clean flue gas leaving the combustor of the gas turbine is passed through an expansion turbine as the working fluid to produce mechanical power and electrical energy. By employing a fuel gas saturated with $H_2O$, the temperature in the combustor of the gas turbine is reduced below that required for the formation of $NO_x$. Air pollution is thereby prevented. Further, the thermal efficienty is improved.

15,218 moles of clean raw fuel gas leaves through lines 41 and 42 at the bottom of annular passage 11 at a temperature of 120° F., a pressure of 359 psia, and with the composition shown in Column (5) of Table 1. This purified gas stream is then introduced directly into a conventional purification zone where at least a portion of the $CO_2$, $H_2S$, COS, and $H_2O$ are removed. The substantially dry stream of purified fuel gas is then introduced into the bottom of inner cylinder 9 of heat exchange zone 6 as previously described where it is humidified by revaporating a portion of the water condensed from the clean raw fuel gas as previously described. Advantageously, the pressure throughout the subject process and in the gas turbine is substantially that as produced in the fuel gas generator less ordinary drop in the lines and equipment. Costly gas compressors are thereby avoided.

TABLE 1

| (1) | (2) | (3) | (4) | (5) |
| --- | --- | --- | --- | --- |
| | Line 1 | Line 30 | Line 40 | Line 41 |
| GAS COMPOSITION | RAW FUEL GAS CONT. WATER MOLES/HR. | SUBST. DRY PURIFIED FUEL GAS MOLES/HR. | PURIFIED-HUMIDIFIED FUEL GAS MOLES/HR. | DEHUMIDIFIED RAW FUEL GAS MOLES/HR. |
| CO | 3854 | 3854 | 3854 | 3854 |
| $H_2$ | 2875 | 2875 | 2875 | 2875 |
| $CO_2$ | 412 | 357 | 357 | 411 |
| $H_2O$ | 1166 | 44 | 957 | 72 |
| $CH_4$ | 6 | 6 | 6 | 6 |
| A | 107 | 107 | 107 | 108 |
| $N_2$ | 8965 | 8965 | 8965 | 8965 |
| $H_2S$ | 88 | — | — | 88 |
| COS | 5 | 3 | 3 | 5 |
| Total | 17478 | 16211 | 17124 | 16384 |

The process of the invention has been described generally and by example with reference to a hydrocarbonaceous feedstock of particular composition for purposes of clarity and illustration only. From the foregoing it will be apparent to those skilled in the art that various modifications of the process and the raw materials disclosed herein can be made without departure from the spirit of the invention.

I claim:

1. An indirect gas to gas heat exchanger comprising a closed vertical inner cylinder and a closed vertical coaxial outer cylinder, spacing means to provide an annular passage between said cylinders, said annular passage being bounded by the outer wall of said inner cylinder and the inner wall of said outer cylinder, said spacing means comprising a series of vertically spaced horizontal annular trays in said annular passage, a plurality of circular openings in each of said trays, an open-ended vertical cylindrically shaped dam with its lower end sealed around each of said openings and in communication therewith, a series of water distribution means vertically spaced in said inner cylinder, means for recycling water which collects on each annular tray to a corresponding water distribution means in said inner cylinder, inlet and outlet means connected respectively near the top and bottom of said annular passage for introducing clean raw fuel gas containing $H_2O$ into the top of said annular passage and removing dehumidified clean raw fuel gas from the bottom of said annular passage; and inlet and outlet means connected respectively near the bottom and top of said inner cylinder for respectively introducing a purified fuel gas containing substantially no $H_2O$ into the bottom of said inner cylinder and removing purified and humidified fuel gas from the top of said inner cylinder; wherein the gas stream passing up through said inner cylinder cools the gas stream passing down through said annular passage to a temperature below the dew point and water condenses out of the gas stream in said annular passage and collects on said annular trays.

2. The apparatus of claim 1 wherein said water-distribution means comprises a series of horizontal segmented disc trays vertically spaced in said inner cylinder, each of said disc trays being at about the same level as a corresponding annular tray, and a vertical dam running along the chord at the end of each disc tray thereby providing a segmented passage between the outside wall of the dam and the inside wall of the inner cylinder.

3. The apparatus of claim 1 wherein said water-distribution means comprises a series of spray nozzles vertically spaced in said inner cylinder, and each of said spray nozzles being at about the same level as a corresponding annular tray.

* * * * *